(12) United States Patent
Ullrich

(10) Patent No.: US 8,588,758 B2
(45) Date of Patent: Nov. 19, 2013

(54) INTERFACING A MOBILE DEVICE WITH A COMPUTER

(75) Inventor: Christopher J. Ullrich, Ventura, CA (US)

(73) Assignee: Immersion Corporation, San Jose, CA (US)

(*) Notice: Subject to any disclaimer, the term of this patent is extended or adjusted under 35 U.S.C. 154(b) by 729 days.

(21) Appl. No.: 12/609,078

(22) Filed: Oct. 30, 2009

(65) Prior Publication Data

US 2011/0105103 A1 May 5, 2011

(51) Int. Cl.
*H04M 3/00* (2006.01)
*H04M 3/42* (2006.01)

(52) U.S. Cl.
USPC ........................................ 455/420; 455/414.1

(58) Field of Classification Search
USPC .............................. 455/420, 414.1, 418, 411
See application file for complete search history.

(56) References Cited

U.S. PATENT DOCUMENTS

| | | | |
|---|---|---|---|
| 6,226,497 B1 | 5/2001 | Güntzer et al. | |
| 6,524,189 B1 | 2/2003 | Rautila | |
| 6,663,010 B2 | 12/2003 | Chene et al. | |
| 6,820,801 B2 | 11/2004 | Kaneko et al. | |
| 7,155,305 B2 | 12/2006 | Hayes et al. | |
| 7,376,441 B2 | 5/2008 | Lee | |
| 2003/0193390 A1 | 10/2003 | Muramatsu | |
| 2004/0002902 A1 | 1/2004 | Muehlhaeuser | |
| 2005/0159823 A1* | 7/2005 | Hayes et al. | 700/19 |
| 2009/0137269 A1* | 5/2009 | Chung | 455/556.1 |
| 2009/0227375 A1 | 9/2009 | Weisman et al. | |
| 2009/0270046 A1* | 10/2009 | Lai | 455/73 |
| 2009/0305789 A1 | 12/2009 | Patil | |
| 2010/0112994 A1* | 5/2010 | Tamura | 455/415 |

* cited by examiner

*Primary Examiner* — Michael Faragalla
(74) *Attorney, Agent, or Firm* — Pillsbury Winthrop Shaw Pittman LLP

(57) ABSTRACT

Systems and methods for interfacing a mobile device and a host computer are described in the present disclosure. In one embodiment, among several, an interfacing system comprises a mobile device, which has a sensor, and a host computer. The sensor of the mobile device detects gestures that are translated to cursor control commands for a display of the host computer.

21 Claims, 3 Drawing Sheets

INTERFACING A MOBILE DEVICE WITH A COMPUTER

TECHNICAL FIELD

The present disclosure generally relates to mobile devices and more particularly relates to systems and methods for interfacing a mobile device with a host computer.

BACKGROUND

For many years, the computer mouse has been an essential part of computer systems for providing a human-computer interface. Normally, the conventional computer mouse includes a position sensing device, such as an optical sensor, a scroll wheel, and two or more buttons. The mouse can report positional information for controlling the location of a cursor on a two-dimensional screen, scroll up or down the screen, and report selection information. Although the computer mouse can be used for entering a number of controls, the mouse suffers from several limitations. For example, the number and type of buttons, optical sensors, and scroll wheels is fixed by the mechanical design of the specific mouse.

Development has been made over the years to improve the design and functionality of positional control devices, e.g., computer mice, in order to provide greater capabilities. For example, one alternative to the common mouse has been the introduction of touchpads, which are often found on laptop computers, to enable a variety of different interactions, including fingertip gestures. Also, gyromice have been developed in recent years. A gyromouse includes a gyroscope, which enables mouse motion in three-dimensional space by mapping mouse tilt with respect to an x-y axis.

SUMMARY

The present disclosure describes systems for interfacing a mobile device with a host computer. In some implementations, an interfacing system comprises a mobile device and a host computer. The mobile device comprises a sensor, which detects gestures that are translated to cursor control commands for a display of the host computer.

The present disclosure may include additional features and advantages, which may not necessarily be expressly disclosed herein but will be apparent to one of ordinary skill in the art upon examination of the following detailed description and accompanying drawings. It is intended that these additional features and advantages be included within the present disclosure.

BRIEF DESCRIPTION OF THE DRAWINGS

The components of the following figures are illustrated to emphasize the general principles of the present disclosure and are not necessarily drawn to scale. Reference characters designating corresponding components are repeated as necessary throughout the figures for the sake of consistency and clarity.

DETAILED DESCRIPTION

Figure 1:
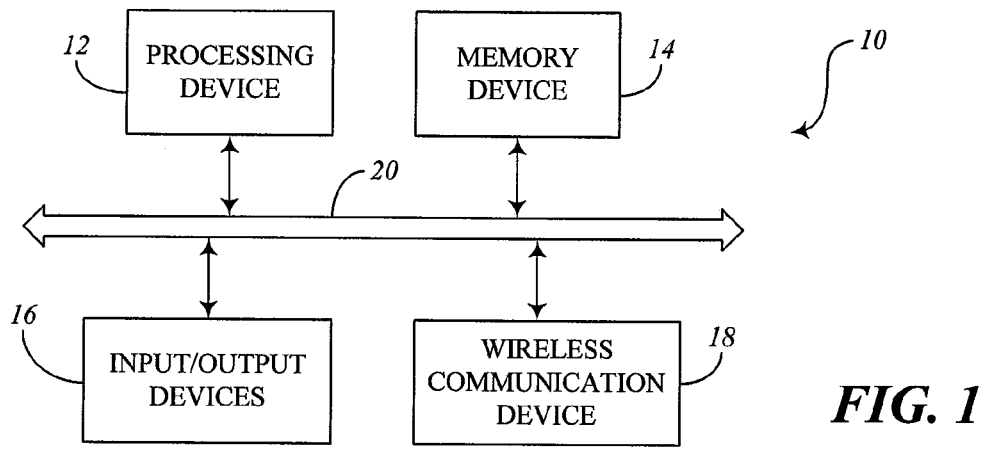
FIG. 1 is a block diagram showing a general schematic of a computing system, according to various implementations of the invention.

The present disclosure describes systems that enable an interfacing connection between a mobile device and a computer (e.g., desktop computer). In some implementations of the invention, the mobile device can be used as a human-computer interface or input/output device associated with the computer. The interface between the mobile device and computer can be a temporary interaction, thus allowing the mobile device to be carried to wherever a user may wish to go and then allowing the mobile device to interface with another computer, and so on. Therefore, the computer can serve as a network accessibility device.

In some implementations, the mobile device can be used as a cursor position control device in place of a mouse. Many mobile devices, such as mobile phones, smart phones, personal digital assistants (PDAs), and other mobile devices, already include various sensors that may be used to detect mouse-type gestures. For example, many mobile devices may include an accelerometer, gyroscope, camera, global positioning system (GPS) navigational sensor, proximity sensor, touch screen, and/or other sensors. Some devices, such as Apple's iPhone, can use a built-in accelerometer to detect when the device is subjected to shaking or other quick movements in one or more directions. According to various implementations of the invention, these and other mobile device gestures can be detected and used for cursor positioning movements on the screen of the paired computer.

Furthermore, the mobile device can leverage its touch screen and accelerometer to enable a more efficient computer interaction. The touch screen can be used to function as both a touchpad, as in a laptop computer, or as a two-dimensional scroll wheel. The accelerometer can be used to enable gesture-based interaction within a windowing desktop, for example, both in 2D and/or in 3D. With well-developed sensors already in place on many mobile devices, advanced interactions with a computer are possible and enable a more flexible computing environment.

In various implementations of the invention, mobile devices may themselves be changed to include additional sensors to sense mouse-type movements. For example, mobile devices may also include an optical position sensor, such as those found in a conventional mouse. The addition of the optical position sensor enhances the mobile device's functionality as an input device for a standard desktop computer or other computing device that uses a windowing interface metaphor, e.g., Microsoft Windows, Apple OS X, etc.

In addition to mouse-type human-computer interactions, the mobile device may be used with the computer to exchange data, information, files, contact information, e-mails, or other exchanges. In other words, the mobile device may be used as a shared storage device. Thus, the mobile device can be a portable computing platform that both enables mobile productivity and the ability to leverage a variety of fixed computing hosts.

For example, suppose a person uses multiple computers on a regular basis, such as at work, at home, on travels, etc. According to various implementations of the invention, the person can store various content including personal information, e-mails, files, and other content on the mobile device and access the content using any corresponding computer. Thus, the person can pair the mobile device with various computers proximate to the mobile device, provided the computer includes a compatible driver. The person can then exchange data as needed on a secure channel with different computers, whether at work, at home, at an airport, in a library, at school, or wherever the compatible computers are located. Also, in some implementations, the mobile device can send preference information to the computer in order to customize a view on the computer, regardless of the native view of the computer being used.

Various implementations of the invention may be applied to an entire network, such as a network associated with a company, a school, a household, or other networks. The user may use the mobile device as a way to enter mouse-type gestures and/or to exchange data with any computer on the network. Accordingly, a business that includes a service architecture model may be established to provide transparent interaction with the Internet or other network. In these implementations, the computer can simply be a portal to the network.

In some implementations of the invention, the mobile device interacts with various computers or processing devices located in a vehicle, equipment, appliance, or other device. For example, depending on who interfaced the computer of a vehicle, the mobile device may allow various adjustments to the vehicle, including automatic climate control, automatic radio settings, seat and mirror positioning, and other adjustments. Not only can the interface be used for automatic adjustments, but it can also provide a user-selected, standard interface to the secondary controls of a vehicle. In some implementations, the vehicle may be used to multiple drivers. In some implementations, the vehicle may be a rental car.

In some implementations, a docking element associated with a certain host computer can be used to hold the mobile device with a mechanical link. In some implementations, the docking element may incorporate an optical position sensing element, like one found on a mouse and allowed to be moved over a surface. The docking element is configured to establish a link with a nearby host computer to communicate information between the computer and any mobile device that is docked. In this regard, the host computer can run device driver software that receives input commands directly from the mobile device or indirectly via the docking element. The input commands may include continuous gesture recognition from an accelerometer and other sensors of the mobile device. The driver software and/or other software on the two paired devices can also manage the exchange of information, e.g., files, personal data, e-mail, contact lists, or other information, between the mobile device and host computer. In some implementations, the docking element may include speakerphone functionality that can be used for both cellular calls and VoIP calling.

In some implementations, the driver software can also provide context dependent graphical user interface information to be displayed on a display screen of the mobile device. This might include various GUI components that correspond to left and right mouse buttons, graphical sliders, mouse wheels, and other GUI components. Depending on the context, additional buttons or controls may be presented on the screen, as dictated by internal software on the mobile device or from a driver layer on the host computer. In some implementations, the mobile device may be used to synchronize content between the mobile device and one or more other computers.

FIG. 1 is a block diagram of a computing system 10 according to various implementations of the invention. Computing system 10 may correspond to a host computer that can be interfaced with a mobile device, a mobile device that can correspond to a host computer, or both. In various implementations, computing system 10 includes, among other things, a processing device 12, a memory device 14, input/output devices 16, and a wireless communication device 18, each interconnected via a bus 20.

When configured as the host computer, computing system 10 may be a desktop computer, laptop computer, electronic workbook, public computing device, kiosk, or other device. In some implementations, computing system 10 may be associated with an on-board computing device or secondary system located in a vehicle. In some implementations, computing system 10 may be a gaming device. When configured as the mobile device, computing system 10 may be a mobile phone, smart phone, PDA, or other portable device.

As a host computer, computing system 10 may be a simple portal device or other similar device with limited processing abilities for allowing a user to access a network, such as the Internet. Computing system 10 may be one of multiple computing devices connected to a network associated with any organization, business, library, airport, school, Internet café, or other network. In this respect, a number of different users can log onto a specific host computer at different times. In order to log on, computer system 10 may request information from a respective mobile device. For example, a code entry, fingerprint scan, or other information, may be used to gain access. In this case, a user needs to have possession of a compatible mobile device to log on and must go through a log-in procedure.

Processing device 12 may be a general-purpose or specific-purpose processor or microcontroller for managing or controlling the operations and functions of computing system 10. In some embodiments, processing device 12 may actually include a plurality of processors, each configured to perform certain functions within computing system 10. Particularly, processing device 12 may execute software stored in memory device 14.

In some implementations, processing device 12 can analyze the context or state of events occurring with respect to a host computer in order to provide variable context-dependent input controls for an interfacing mobile device. For example, in a particular software application, the processing device 12 may recognize that certain commands, such as scroll up, scroll down, insert, delete, copy, paste, save, bookmark, search, and/or other commands, are used on a regular basis. Thus, depending on what actions are being executed within the application, processing device 12 can control what the mobile device's touch screen device displays, which provides a customized input device to the user for specific commands related to that application. In this regard, the user's display can be dynamic and refreshable.

Memory device 14 may include one or more internally fixed storage units, removable storage units, and/or remotely accessible storage units, each including a tangible storage medium. The various storage units may include any combination of volatile memory and non-volatile memory. The storage units may be configured to store any combination of information, data, instructions, software code, etc.

In some implementations, the storage devices may include driver software, which may be similar to mouse driver software, for interpreting gestures of a mobile device that is paired with the host computer. Thus, instead of conventional mouse driver software, memory device 14 may store driver software for enabling any number of mobile devices to interface with the host computer. When computing system 10 is configured as a mobile device, the mobile device includes compatible device driver software for enabling interfacing with any number of host computers.

Additional software may be incorporated in memory device 14 to allow the exchange of information and data between the host computer and mobile device. In some implementations, a universal protocol can be established that would allow any mobile device or groups of mobile devices to interface with any computer host or group of computer hosts. In some implementations, existing protocols can be leveraged to accomplish this type of data exchange. This simplifies the interface between a plurality of available mobile devices and host computers.

Input/output devices 16 may also include specific input mechanisms and output mechanisms. For example, the input mechanisms may include various data entry devices, such as keyboards, keypads, touchpads, cursor control devices, microphones, or other data entry devices. Output mechanisms may include various data output devices such as computer monitors, display screens, audio output devices, and/or other data output devices. Input/output devices 16 may include mechanisms that are designed not only to receive input from a user, but also to provide feedback to the user, such as touch screen devices. In place of some conventional components such as computer mice, input/output devices 16 may include interaction devices, dongles, and/or other input/output devices, to enable input and/or output communication between a host computer and a mobile device.

Wireless communication device 18 is configured to enable communication between an external device and computing system 10. In some implementations, wireless communication device 18 may be associated with one or more input/output devices 16. Wireless communication device 18 may include hardware and/or software for allowing communication according to various communication protocols, such as, for example, Bluetooth, Wi-Fi, or other communication protocols. In some implementations, wireless communication device 18 may be necessary for communication between at least the host computer and mobile device. In some implementations, wireless communication device 18 may be omitted if it is not needed. Wireless communication device 18 can be included on both interfacing devices, or pairing devices, in various implementations where wireless communication is made.

FIGS. 2-8 represent various implementations for enabling interaction between a mobile device and computer. One application of mobile device in these arrangements is as a cursor control device on a two-dimensional display of the computer. The directional control can be similar to mouse control. Driver software on both computer and mobile device can be used to call up interface functionality to pair the two devices when the mobile device is within range of computer or positioned in a docking element. Direction control functions, which may be similar to mouse functions, such as position information, left click, right click, scroll wheel for scrolling up or down, scroll wheel click, can be communicated from the mobile phone to the host computer. In this respect, the mobile device can be used in place of a conventional computer mouse. In addition, other sensors incorporated on the mobile device can also be used to control and/or enter additional information. The host computer can be a desktop computer, laptop computer, gaming device, etc., and mobile device can be used as a gaming controller, remote control device, an immersive virtual control device, etc. In some implementations, when the mobile device is paired with the host computer, it can be interrupted by an incoming phone call using typical interruption code and protocols.

In some implementations of the invention, the pairing of the host computer and mobile device enable data to be exchanged between the two devices. For example, a data transfer may include transferring content stored in the mobile device to the host computer or transferring content stored in the host computer to the mobile device. The data transfer may also include transferring user preferences stored in the mobile device to the host computer or transferring user preferences stored in the host computer to the mobile device. The data transfer can also include transferring security information, transferring log-in information, transferring files, etc.

The respective mobile devices of each arrangement may include any suitable electronic handheld device, such as a mobile phone, smart phone, gaming device controller, personal digital assistant (PDA), portable media player, portable e-mail device, portable web browser or Internet access device, external drive, etc. The mobile device may have certain sensors or components that are typically a part of such a device. For example, the mobile device may include a digital camera built into the device, a global positioning system (GPS) device, an accelerometer, a gyroscope, a proximity sensor, a touch screen, and/or other sensors or components.

In addition to these typical sensors, the mobile device may also include other sensors, such as optical sensors, CMOS sensors, photodiodes, infrared sensors, or other various sensors. In some implementations, these additional sensors may require one or more LEDs, laser diodes, lights, infrared laser, or other illumination devices for illuminating a surface or area to be optically sensed. Additionally, the mobile device may further include a touchpad, fingerprint scanner, or other devices, wherein the functionality and application of these are described in more detail below.

In some implementations of the invention, security measures may be used to provide a secure interface, particularly when wireless communication is used between interfacing devices. Because there are multiple pairing combinations, security software can be included to detect the interaction with different types of mobile devices. When a pairing is established, transmission of sensitive information can be made over an encrypted channel. In addition, in order to establish a secure pairing initially, passwords, log-in codes, biometrics, and/or other authentication techniques, can be used.

Figure 2:
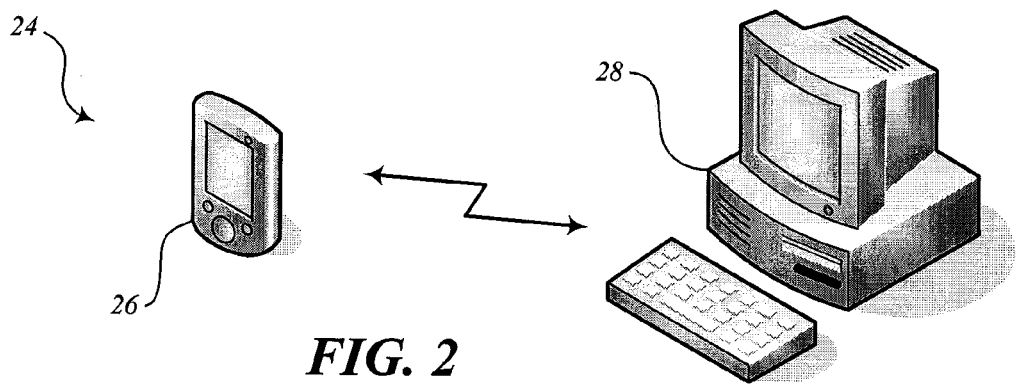
FIG. 2 is a diagram illustrating a system for interfacing a mobile device with a computer, according to various implementations of the invention.
Figure 4:
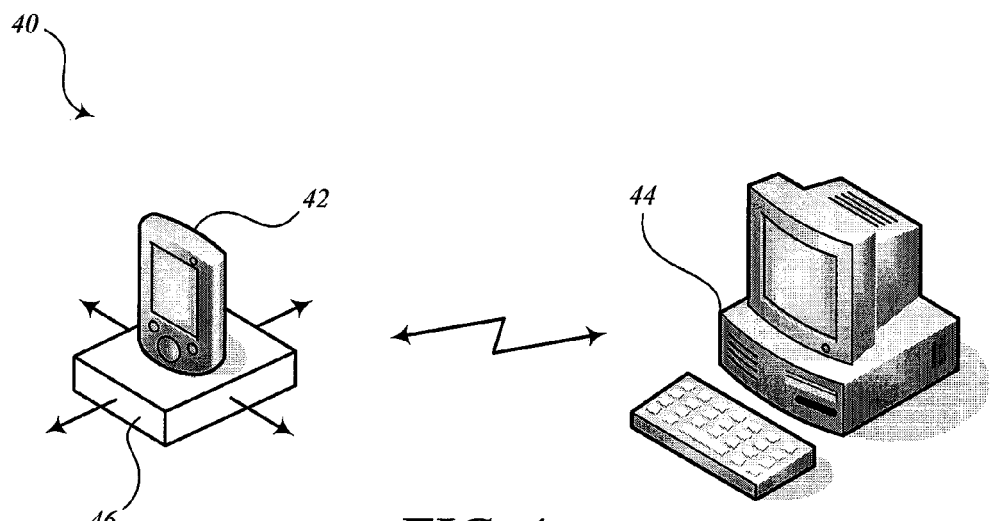
FIG. 4 is a diagram illustrating a system for interfacing a mobile device with a computer, according to various implementations of the invention.
Figure 6:
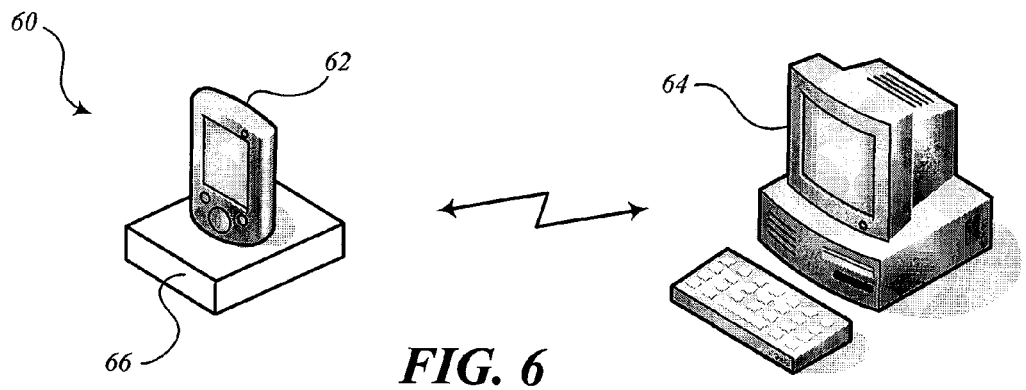
FIG. 6 is a diagram illustrating a system for interfacing a mobile device with a computer, according to various implementations of the invention.

FIGS. 2, 4, and 6 illustrate implementations of various wireless communication configurations between a mobile device and computer. Wireless communication device 18 illustrated in FIG. 1 may be incorporated in both the mobile device and host computer to enable communication via a wireless channel between the two devices. For example, communication along the wireless channel may include a short-range communication protocol, such as a personal area network (PAN), Bluetooth, Wi-Fi, wireless firewire, infrared communication, or other communication protocol.

In various implementations of the invention, the battery of the mobile device can be recharged from a docking element. This may be possible when the docking element itself is properly charged and includes a sufficient battery capacity for charging the mobile device.

In contrast to FIGS. 2, 4, and 6, implementations illustrated in FIGS. 3, 5, 7, and 8 include a wired connection for coupling the respective mobile device to the host computer. A universal series bus (USB) connection or other suitable connector can be used between the components. In these implementations, the battery of the mobile device can be easily recharged using known charging circuitry.

Figure 3:
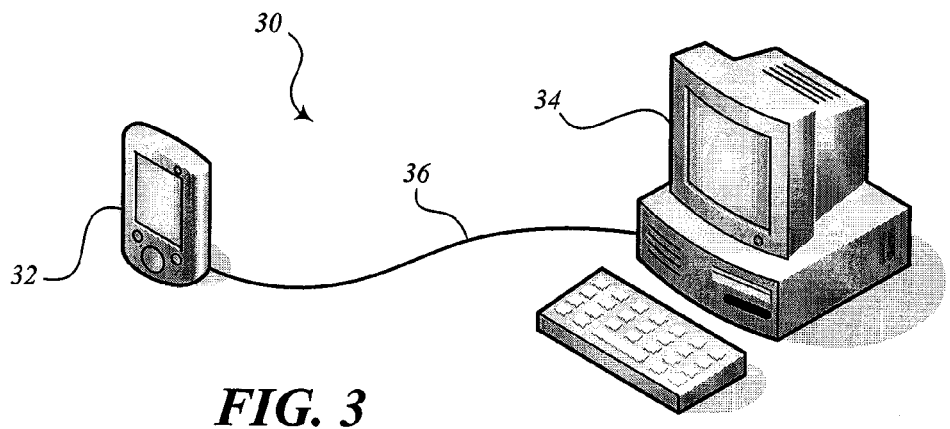
FIG. 3 is a diagram illustrating a system for interfacing a mobile device with a computer, according to various implementations of the invention.
Figure 5:
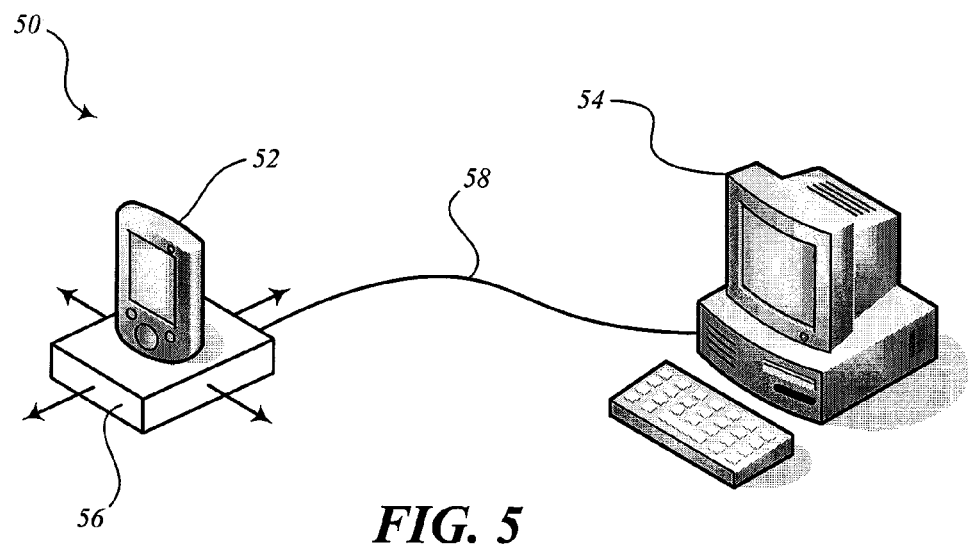
FIG. 5 is a diagram illustrating a system for interfacing a mobile device with a computer, according to various implementations of the invention.
Figure 7:
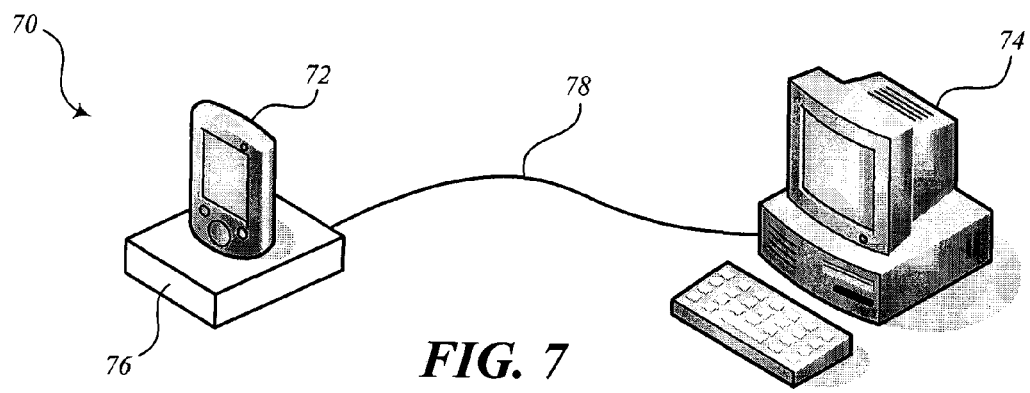
FIG. 7 is a diagram illustrating a system for interfacing a mobile device with a computer, according to various implementations of the invention.
Figure 8:
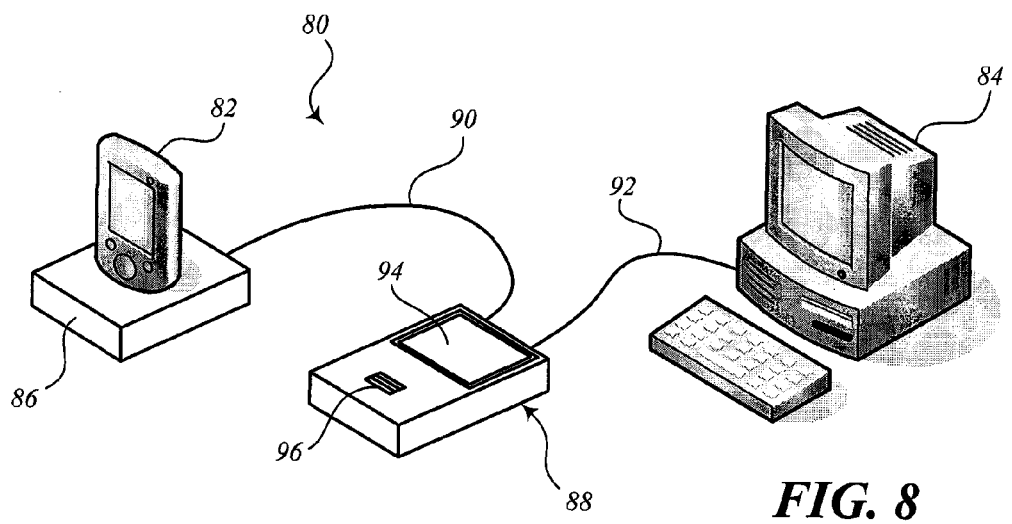
FIG. 8 is a diagram illustrating a system for interfacing a mobile device with a computer, according to various implementations of the invention.

FIGS. 2 and 3 illustrate communication between a mobile device and a host computer without the use of a docking element or base device. In this respect, the mobile device is able to communicate directly with the host computer. FIGS. 4 and 5 illustrate implementations that include a base or docking element, which is configured to cradle the mobile device. In these examples, the docking element is movable across a surface, similar to the movement of a computer mouse on a desktop surface. FIGS. 6-8 illustrate implementations that include a docking element for supporting the mobile device. However, as illustrated in FIGS. 6-8, the docking element is stationary, and directional information can be entered on a touch screen of the respective mobile device or on a touchpad of a user input device.

The docking elements illustrated in FIGS. 4-8 are now described. In some implementations, the docking element may have a built-in camera that faces the user. This can enable video conferencing applications. In some implementations, the docking element can also be used to enable the computer to serve as a portal by multiple users to access a network. In some implementations, the docking element is designed to support a mobile device physically so as to lock it into place. In some implementations, the docking element may also be designed to adapt to the shapes, styles, and sizes of various types of mobile devices. In these implementations, the docking element may also include an adaptor if necessary to properly support specific mobile devices. In addition, the docking element can be designed (not shown) in a manner to provide ergonomic comfort for the user. Although otherwise illustrated, in some implementations, the mobile device may be placed in the docking element such that the mobile device is laid on its back and faces upward, enabling the user to press down easily on buttons on the face of the mobile device or a touch screen on its face. In some implementations, the docking element may be designed to assist with the exchange of position control information, data, files, etc., between the mobile device and host computer.

FIG. 2 is a diagram illustrating an interfacing system 24 for enabling interaction between a mobile device 26 and a host computer 28 according to various implementations of the invention. Mobile device 26 may have other functionality apart from its interfacing configuration as illustrated. In some implementations, mobile device 26 may be used as a human-computer interface for enabling a user to enter commands into host computer 28. Particularly, the communication between mobile device 26 and host computer 28 is a wireless channel. For example, the wireless channel may include a short-range communication protocol.

FIG. 3 is a diagram illustrating an interfacing system 30 for enabling interaction between a mobile device 32 and a host computer 34 according to various implementations of the invention. Mobile device 32 may have other functionality apart from its interfacing configuration as illustrated. In some implementations, mobile device 32 may be used as a human-computer interface for enabling a user to enter commands into host computer 34. Communication between mobile device 32 and host computer 34 is made via a wired transmission line 36, such as a USB cable or other wired communication link. Connectors (not shown) are configured at the ends of transmission line 36 for coupling with corresponding receptacles of mobile device 32 and host computer 34. In some implementations, mobile device 32 can be recharged by host computer 34 via transmission line 36.

In FIGS. 2 and 3, directional information from mobile device 26 or 32 can be used to control the movement of one or more cursors on a monitor associated with host computer 28 or 34. The directional information and other types of input information can be received by multi-touch input modalities or any suitable type or types of input devices. Directional information may be detected from sensors, such as accelerometers, on mobile device 26, 32 or by stylus or finger movements on a touch screen of mobile device 26, 32. Extra sensors can be added to mobile device 26, 32, such as proximity sensors, positional sensors, fingerprint scanners for security or log on. Directional information can be provided to host computer 28, 34 to control directional movement of a cursor on a screen of host computer 28, 34.

Furthermore, host computer 28, 34 can monitor the context and/or state of actions occurring with respect to processing therein and then communicate the context and/or state to mobile device 26, 32 so that specific context-dependent and/or state-dependent displays can be presented on mobile device 26, 32. The display can be changed on mobile device 26, 32 based on changes in the context and can be refreshed as needed. Mobile device 26, 32 can be configured to display various GUI components.

In some implementations, directional information may or may not be needed. For example, when used in a system involving a host computer 28, 34 that is configured as an on-board computer of a vehicle, positional information may not be needed. Instead, a data transfer can be made from mobile device 26, 32 for providing preference information to host computer 28, 34. Mobile device 26, 32 may include a universal database that can be used in any vehicle, such as a rental car, that provides the user's preference information to adjust radio settings, climate control, for the user's particular tastes. In this way, mobile device 26, 32 can interface with a secondary system of vehicle.

In some implementations, mobile device 26 may interface with any appliance or device having a built-in processor. A user can store fixed settings, personal information, preferences, etc., in mobile device 26, 32 and use this information when mobile device is paired with the processor of such a system. Also, mobile device 26, 32 and host computer 28, 34 may exchange information for a log-in procedure.

FIG. 4 is a diagram illustrating an interfacing system 40 for enabling interaction between a mobile device 42 and a host computer 44 according to various implementations of the invention. Mobile device 42 may have other functionality apart from its interfacing configuration as illustrated. Mobile device 42 may be used as a human-computer interface for enabling a user to enter commands into host computer 44. Particularly, the communication between mobile device 42 and host computer 44 is a wireless channel. In some implementations, the wireless communication can be made via a docking element 46.

As illustrated in FIG. 4, docking element 46 can be moved over a surface of a desk, table, etc. Docking element 46 is configured to support mobile device 42 physically in any suitable orientation. In some implementations, mobile device 42 may be designed to be laid flat on its back to enable physical coupling with docking element 46. Furthermore, docking element 46 may be designed in a number of ways to be adapted to any type of mobile device. Different docking elements can be designed to adapt to different models of mobile devices as necessary. In some implementations, docking element 46 may include an electrical interface for enabling communication with mobile device 42. In some implementations, mobile device 42 and docking element 46 may communication via wireless transmission, such as according to a PAN protocol. In some implementations, docking element 46 may include a transceiver or other wireless communication device for communicating wirelessly with host computer 44. In some implementations, wireless communication with host computer 44 may be made by either or both of mobile device 42 and docking element 46.

FIG. 5 is a diagram illustrating an interfacing system 50 for enabling interaction between a mobile device 52 and a host computer 54 according to various implementations of the invention. Mobile device 52 may have other functionality apart from its interfacing configuration as illustrated. Mobile device 52 may be used as a human-computer interface for enabling a user to enter commands into host computer 54. Mobile device 52 is supported by a docking element 56, and communication between mobile device 52 and host computer 54 is made via docking element 56 and a wired transmission line 58, such as a USB cable. In some implementations, connectors (not shown) may be configured at the ends of transmission line 58 for coupling with corresponding receptacles of docking element 56 and host computer 54. Mobile device 52 can be recharged by host computer 54 via docking element 56 and transmission line 58.

In some implementations, the movement of docking element 56 can be detected and communicated to host computer 54. For example, docking element 56 can include sensors for monitoring movement. These sensors may include optical sensors or other suitable motion detecting devices.

FIG. 6 is a diagram illustrating an interfacing system 60 for enabling interaction between a mobile device 62 and a host computer 64 according to various implementations of the invention. Mobile device 62 may have other functionality apart from its interfacing configuration as illustrated. Mobile device 62 may be used as a human-computer interface for enabling a user to enter commands into host computer 64. Interfacing system 60 also includes a docking element 66, which is configured to remain stationary on a surface. Therefore, movement information can be sensed by mobile device 62 using a touch screen thereon. The communication between mobile device 62 and host computer 64 is a wireless channel and may involve communication via the docking element, i.e., docking element 66 in this case.

FIG. 7 is a diagram illustrating an interfacing system 70 for enabling interaction between a mobile device 72 and a host computer 74 according to various implementations of the invention. Mobile device 72 may have other functionality apart from its interfacing configuration as illustrated. Mobile device 72 may be used as a human-computer interface for enabling a user to enter commands into host computer 74. Interfacing system 70 also includes a docking element 76 and transmission line 78. Communication between mobile device 72 and host computer 74 is made via docking element 76 and transmission line 78.

In FIGS. 6 and 7, docking element 66, 76 is stationary on the surface on which it rests. Therefore, directional information can be detected by a touch screen on mobile device 62, 72. Software on host computer 64, 74 or on mobile device 62, 72 may include specific displays that are context-dependent and/or state-dependent to adapt the input buttons or controls to those that may be needed at the time. Again, the displays can be dynamic, or change over time, as needed, depending on the particular context. The displays are also refreshable.

FIG. 8 is a diagram illustrating an interfacing system 80 for enabling interaction between a mobile device 82 and a host computer 84 according to various implementations of the invention. Mobile device 82, when not docked, may have other functionality apart from its interfacing configuration as illustrated. Mobile device 82 may be used as a human-computer interface for enabling a user to enter commands into host computer 84. In addition to these two main interfacing components, interfacing system 80 also includes a docking element 86 and a user input device 88. Docking element 86 is connected to user input device 88 via a first transmission line 90. User input device 88 is connected to host computer 84 via a second transmission line 92. In some implementations, communication can be made among the different components using wireless communication in place of transmission lines 90 and 92.

In some implementations, user input device 88 includes, among other things, a touchpad 94 and a fingerprint sensing device 96. In some implementations, user input device 88 can be configured to include more or fewer sensing elements as needed and according to design. For example, touchpad 92 can instead be configured as a touch screen, whereby a display of mouse-type controls are presented on the display of touch screen. In some implementations, user input device 88 can be a mouse with a touch screen mounted on a back side of it. The touch screen could include a mouse wheel or other controls drawn on the screen for enabling mouse-type movements.

A number of possible implementations and examples are described herein and are not intended to necessarily limit the present disclosure to any specific implementations. Instead, various modifications can be made to these implementations as would be understood by one of ordinary skill in the art. Any such modifications are intended to be included within the spirit and scope of the present disclosure and protected by the following claims.

I claim:

1. A system comprising:
    a mobile telephone comprising:
        at least one sensor configured to detect movement and generate a signal based on the detected movement, and
        a memory that stores user preference information corresponding to at least one setting to be controlled based on the user preference information, wherein the mobile telephone provides the user preference information; and
    a host computer configured to:
        interface with the mobile telephone,
        receive the generated signal and the user preference information from the mobile telephone,
        translate the generated signal to a command that controls a cursor for a display of the host computer, and
        control, at the host computer, the at least one setting based on the user preference information, wherein the user preference information is associated with a custom view on the host computer preferred by the user, and wherein the host computer generates the custom view based on the user preference information.

2. The system of claim 1, wherein the at least one sensor comprises a touch screen that detects movement of a finger of the user.

3. The system of claim 1, wherein the at least one sensor comprises an accelerometer, a gyroscope or a proximity sensor that detects movement of the user.

4. The. system of claim 1, wherein the mobile telephone is interfaced to the host computer via a docking station.

5. The system of claim 1, wherein the mobile telephone is interfaced to the host computer via a wireless communication protocol.

6. The system of claim 5, wherein the wireless communication protocol comprises a personal area network.

7. The system of claim 6, wherein the personal area network comprises a Bluetooth protocol or a Wi-Fi protocol.

8. The system of claim 4, wherein the docking station is wirelessly interfaced to the host computer.

9. The system of claim 1, wherein the host computer is configured as a computer of a vehicle, and wherein the user preference information comprises a climate control setting, a radio control setting, a seat position control setting, or a mirror control setting for the vehicle.

10. The system of claim 1, wherein the at least one sensor comprises a fingerprint scanner.

11. A mobile device comprising:
A memory configured to store user preference information corresponding to at least one setting to be controlled based on the user preference information, wherein the mobile device provides the user preference information; and
a processor configured to:
communicate with a host computer;
receive first display information from the host computer, wherein the first display information varies based on an event occurring at the host computer;
generate a graphical user interface based on the received first display information;
receive an input to the graphical user interface;
generate a signal based on the input, wherein the signal is associated with a command to be executed at the host computer; and
communicate the signal and the user preference information to the host computer, wherein the user preference information is associated with a custom view on the host computer preferred by a user, and wherein the host computer generates the custom view based on the user preference information.

12. The mobile device of claim 11, wherein the first display information comprises context-dependent or state-dependent information associated with an application at the host computer.

13. The mobile device of claim 11, further comprising a presence detector that detects when the mobile device is brought within range of the host computer thereby enabling short range communication between the mobile device and host computer.

14. A computing device, comprising:
a processor configured to:
communicate with a mobile device;
receive, from the mobile device, user preference information corresponding to at least one setting to be controlled based on the user preference information, wherein the user preference information is associated with a custom view on the computing device preferred by a user;
determine a first event occurring at the computing device;
determine first display information based on the first event; and
communicate the first display information to the mobile device, wherein the first display information is configured to cause the mobile device to generate a graphical user interface and
generate the custom view based on the user preference information.

15. The computing device of claim 14, wherein the processor is further configured to:
determine a second event occurring at the computing device;
determine second display information based on the second event, wherein the second display information is different from the first display information; and
communicate the second display information to the mobile device.

16. The computing device of claim 14, wherein the first display information comprises a graphical user interface component configured to receive an input at the mobile device.

17. The computing device of claim 16, wherein the processor is further configured to receive a command from the mobile device based on the input.

18. The computing device of claim 17, wherein the processor is further configured to:
recognize a frequency of use of the command; and
customize the first display information based on the recognized frequency of use.

19. The computing device of claim 14, wherein the processor is further configured to execute an application, and wherein the first event is associated with the application.

20. The computing device of claim 14, wherein the processor is further configured to:
receive user preference information from the mobile device; and
generate a display associated with the computing device based on the user preference information.

21. The computing device of claim 14, wherein the processor is further Configured to:
receive user preference information from the mobile device; and
control a climate control setting, a radio control setting, a seat position control setting, or a mirror control setting based on the user preference information.

* * * * *